US008751350B2

(12) United States Patent
Hadi et al.

(10) Patent No.: US 8,751,350 B2
(45) Date of Patent: Jun. 10, 2014

(54) CONVERSION AND LIQUIDATION OF DEFAULTED POSITIONS

(75) Inventors: Muhammed Hadi, Chicago, IL (US); Dale Michaels, Westmont, IL (US); Amy Stephen, Chicago, IL (US); Suneel Iyer, Chicago, IL (US); Ketan Patel, Hanover Park, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 1644 days.

(21) Appl. No.: 11/954,656

(22) Filed: Dec. 12, 2007

(65) Prior Publication Data

US 2009/0157561 A1 Jun. 18, 2009

(51) Int. Cl.
*G06Q 40/06* (2012.01)
(52) U.S. Cl.
USPC ........................................... 705/36 R
(58) Field of Classification Search
USPC ................................. 705/35, 36 R
See application file for complete search history.

(56) References Cited

U.S. PATENT DOCUMENTS

| | | | | |
|---|---|---|---|---|
| 5,806,048 | A * | 9/1998 | Kiron et al. | 705/36 R |
| 6,754,639 | B2 * | 6/2004 | Ginsberg | 705/36 R |
| 7,225,153 | B2 | 5/2007 | Lange | |
| 7,389,262 | B1 * | 6/2008 | Lange | 705/37 |
| 7,444,300 | B1 * | 10/2008 | Broms et al. | 705/35 |
| 7,496,531 | B1 * | 2/2009 | Gastineau et al. | 705/35 |
| 7,509,275 | B2 * | 3/2009 | Glinberg et al. | 705/35 |
| 7,516,098 | B2 * | 4/2009 | Ginsberg | 705/37 |
| 7,565,320 | B2 * | 7/2009 | Ginsberg | 705/37 |
| 2002/0091624 | A1 | 7/2002 | Glodjo et al. | |
| 2003/0061148 | A1 | 3/2003 | Alavian | |
| 2003/0097331 | A1 | 5/2003 | Cohen | |
| 2003/0101123 | A1 * | 5/2003 | Alvarado et al. | 705/36 |
| 2004/0019557 | A1 | 1/2004 | Yaruss et al. | |
| 2004/0024692 | A1 * | 2/2004 | Turbeville et al. | 705/38 |
| 2004/0225593 | A1 | 11/2004 | Frankel et al. | |
| 2005/0108128 | A1 | 5/2005 | Kastel et al. | |
| 2006/0036534 | A1 | 2/2006 | Hirani et al. | |

OTHER PUBLICATIONS

Bylund, Matthias, "A Comparison of Margin Calculation Methods for Exchange Traded Contracts", 2002.
International Preliminary Report on Patentability for PCT/US2007/16610, dated Feb. 26, 2009, 10 pages.
International Search Report and Written Opinion for PCT/US2008/85306, dated Feb. 4, 2009, 7 pages.
International Search Report and Written Opinion for PCT/US2007/16610, dated Aug. 8, 2008, 6 pages.
International Search Report and Written Opinion for PCT/US2008/72887, dated Nov. 14, 2008, 7 pages.

* cited by examiner

*Primary Examiner* — Lindsay M. Maguire
(74) *Attorney, Agent, or Firm* — Brinks Gilson & Lione

(57) ABSTRACT

A method of liquidating defaulted positions associated with centrally cleared financial product is disclosed. The method includes identifying a defaulted position associated with a centrally cleared financial product, calculating a value differential between the defaulted position and a standard position, offering the value differential and the standard position to a party such that the value differential and the standard position represent a converted position, and settling the converted position upon acceptance of the offer by the party.

19 Claims, 2 Drawing Sheets

CONVERSION AND LIQUIDATION OF DEFAULTED POSITIONS

CROSS-REFERENCE TO RELATED APPLICATIONS

This patent is related to co-pending U.S. patent application Ser. No. 11/950,117, filed on Dec. 4, 2007, titled "FACTORIZATION OF INTEREST RATE SWAP VARIATION", the content of which is incorporated herein by reference for all purposes.

TECHNICAL FIELD

This patent generally relates to methods, systems and processes for the administration of financial instruments, and more specifically to conversion and liquidation of defaulted open positions for illiquid markets.

BACKGROUND

An interest rate swap (IRS) is an example of one type of an illiquid financial product in which the parties agree to exchange streams of future interest payments based on a specified principal or notional amount. An IRS Swaps are often used to hedge interest rate risk or may be used for speculative purposes. An example of an IRS is a plain fixed-to-floating, or "vanilla," interest rate swap. The vanilla swap includes an exchange of a stream of payments based on a floating rate with a stream based on a fixed rate. Both payment streams are calculated over a notional amount.

Usually, at least one of the legs to a swap has a variable rate. The rate is called variable because it may be reset. The variable interest rate may be linked to a periodically known or agreed upon rate for the term of the swap, such as the London Interbank Offered Rate (LIBOR). The variable rate may be based on other agreed upon factors such as a reference rate, the total return of an asset, an economic statistic, etc. Other examples of swaps include total return swaps, and equity swaps.

The expiration or maturity of the streams of payments may occur well into the future. A book of existing and new IRSs may include swaps having a variety of maturity dates. Currently, financial institutions such as banks engage in swaps in an illiquid market, where each party bears the risk of default by the other party. That is, each party bears the credit risk of having any one or all of its counterparties defaulting on the payments.

For interest rate swaps and other illiquid derivative products that are centrally cleared, the central counterparty takes on the credit risk of the parties. That is, a central counterparty may be the counterparty to each party to the IRS transaction, thereby eliminating the credit risk for each party. The central counterparty may be a clearing house, such as the clearing house of the CME Group, Inc. located at 20 South Wacker Drive, Chicago, Ill. The central counterparty may act as a guarantor to each party of the streams of payments to each. The central counterparty may mitigate its credit risks for each party by requiring each party to maintain a minimum amount of funds that are readily accessible to the clearing house. The amount of the funds may be periodically determined, such as through a periodic mark-to-mark process.

The risk to the central counterparty may exist for the life of a stream of payments. Even if one of the parties were to default on an IRS, the central counterparty would take on the position to continue to guarantee payments to the non-defaulting party associated with the IRS. To mitigate its risks, the central counterparty would liquidate the position in the market. However, for defaulted positions in illiquid markets, it may not be possible to find a reasonable liquidation for the defaulted position.

It would be desirable to provide methods, systems and processes for the administration, conversion and liquidation of defaulted open positions for illiquid markets.

SUMMARY

Systems and processes for converting and liquidating of defaulted positions, such as open positions derived or resulting from interest rate swaps (IRS) transactions are disclosed. The disclosed systems and processes are not limited to open positions derived or resulting from IRS transactions or any particular illiquid financial instruments. Instead, the systems and processes may be generally applied to any negotiable financial instruments and investment vehicles. In one exemplary embodiment, innovations for converting and liquidating of defaulted positions for centrally cleared illiquid products are disclosed. For example, an embodiment provides for desirable conversion of a defaulted position in an illiquid market for an IRS.

In one embodiment, a method of liquidating defaulted positions associated with centrally cleared financial product is disclosed. The method includes identifying a defaulted position associated with a centrally cleared financial product, calculating a value differential between the defaulted position and a standard position, offering the value differential and the standard position to a party such that the value differential and the standard position represent a converted position, and settling the converted position upon acceptance of the offer by the party.

In another embodiment, a method of liquidating defaulted positions associated with centrally cleared financial product is disclosed. The method includes identifying a defaulted position associated with a centrally cleared financial product, identifying at least one non-defaulting party such that the non-defaulting party holds at least one position determined to be similar to the defaulted position, calculating a net present value differential between the defaulted position and a standard position, establishing an auction for the at least one non-defaulting party based on the value differential and the standard position to a party such that the value differential and the standard position represent a converted position, and settling the converted position upon acceptance of an offer by the at least one non-defaulting party.

In another embodiment, a default position auction system for auctioning defaulted positions associated with illiquid financial instruments is disclosed. The system includes a processor in communication with a computer readable medium, the computer readable medium storing instructions executable by the processor. The instructions may be configured to clear transactions associated with illiquid financial products, wherein at least one of the transactions results in an open position associated with the illiquid financial product held by a party to the transaction, determine a performance bond requirement associated with the open position, calculate a default position according to a failure of the party to comply with the performance bond requirement, convert the defaulted position to a financial equivalent position having a converted term, and establish an auction for the converted defaulted position in an open market for a financial instrument having the converted term, the converted defaulted position being offered in an electronic trading system.

Other embodiments are disclosed, and each of the embodiments can be used alone or together in combination. Addi-

DETAILED DESCRIPTION

Exemplary embodiments of methods, apparatuses, systems and financial products that provide for efficient conversion and liquidation of defaulted positions such as, for example, a defaulted position on an IRS product are disclosed and discussed below. Embodiments for conversion and liquidation of defaulted positions provide for clearing of a defaulted position from a central counterparty. Methods for converting and liquidating defaulted positions may convert a sunk cost/defaulted swap into a recoverable and attractive swap through a valuation of illiquid swaps. This conversion may provide both counterparties (i.e., buyers and sellers) with advantages, such as being able to buy a converted swap at a discount and sell it at market value. A seller may offload the credit/default risk and continue an originally agreed upon swap contract.

Figure 1:
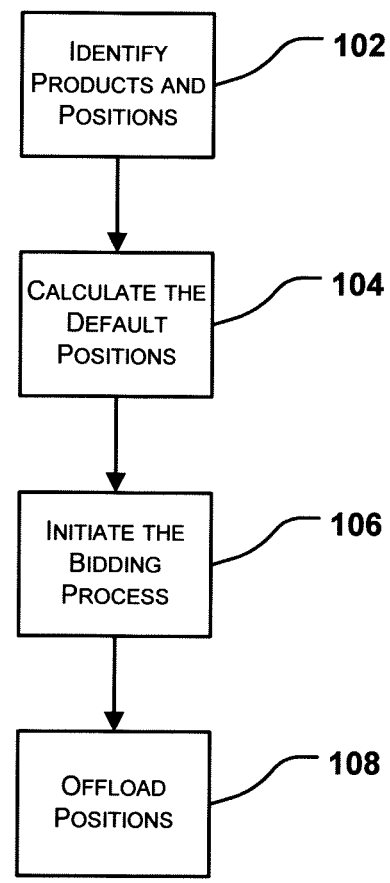
FIG. 1 illustrates an exemplary embodiment of a conversion and liquidation method.

FIG. 1 illustrates a high-level embodiment of a method 100 of administration, conversion and liquidation of defaulted IRS positions. The exemplary method 100 discloses converting defaulted illiquid swaps to liquid or standardized swaps which may, in turn, be disposed of or traded in any known manner. It will be understood that the precise order and steps disclosed in connection with the method 100 may be varied, rearranged and otherwise reordered to achieve a desired result.

At block 102, a central counterparty or clearing house, such as the CME Group, Inc. located at 20 South Wacker Drive, Chicago, Ill., may determine that a party to a swap position or contract has defaulted. In other words, the central counterparty determines that at least one party to, for example, a swap product, has failed to perform on its portion of the swap contract. Upon this determination, the central counterparty may identify and determine other non-defaulting parties holding positions opposite to that of the swap position in default. For example, if the swap position in default represents a fixed leg of an interest rate swap (IRS), then the central counterparty may identify all of the parties to the floating legs of similarly situated swaps.

At block 104, the current or present financial value of the swap position in default may be determined. For example, the swap or other financial product that is the source if the swap position in default may have been in existence long enough to have a non-standard term, e.g., a nine and a half (9.5) year term as opposed to a standard nine (9) or ten (10) year term. This non-standard term results in the swap contract being considered illiquid because it is not readily tradable or disposable. Thus, in order to determine the current or present financial value of the illiquid swap position in default, a net present value (NPV) differential between the illiquid swap position having the non-standard term and the liquid or standardized swap position having a standard term may be calculated.

The exemplary method 100 may be evaluated utilizing one or more yield curve (not shown) that may be utilized to determine the NPV differential (as a function of a swap value factor (SVF)) between the liquid swap curve and the illiquid swap curve. For example, in the case of a forward swap having a nine and a half (9.5) year maturity, a pay fixed rate of five point one-five percent (5.15%) and a receive floating rate pegged at the three month LIBOR (3M-LIBOR). It will be understood that the volume of trading on a nine and a half year swap is virtually zero while the volume of trade on a standard ten year swap is very large. Thus, in order to liquidate the nine and a half year swap to would be desirable to convert the illiquid swap to a liquid, i.e., easily tradable, 10 year swap. Mathematically, the relationship between these two swaps and their values may be described as: NPV(9.5 year Swap)+NPV(0.5 year forward Swap)=NPV(10 year Swap) where the NPV(0.5 year forward Swap) is unknown and must be calculated and/or estimated as the Recovery Conversion Value (RCV) in order to determine the value of the illiquid swap position in default. Stated another way, the RCV is the amount of liquidity premium that market participants require to assume or take-on the defaulted and illiquid swap. The SVF is the sum of the day count adjusted discount factors of the swap yield curve to a desired maturity. Additional details related to the SVF are discussed and described in the incorporated U.S. patent application Ser. No. 11/950,117. The equations (1) to (4) of Table 1 provide an exemplary mathematical illustration of how the RCV may be determined. Equations (5) and (6) provide a specific example of how the Implied Price of an nine and a half year (9.5) swap may be determined.

TABLE 1

(1) NPV(9.5 year Swap) + NPV(0.5 year forward Swap) = NPV(10 year Swap)
(2) NPV(0.5 year forward Swap) = Recovery Conversion Value
(3) NPV(9.5 year Swap) + Recovery Conversion Value = NPV(10 year Swap)
(4) Recovery Conversion Value = Price of 10 year Swap − Implied Price of 9.5 year swap
(4a) RCV = [(Current Rate of Desired/More Liquid Swap * Current SVF Liquid) − (Current Rate of Defaulted/Illiquid Swap * Current SVF of Illiquid)] * (Notional/Face Amount of Illiquid Swap)
(5) Implied Price of 9.5 year Swap = (implied rate of 9.5 Swap) * (SVF-9.5year) * (Notional/Face Amount of 9.5 y Swap)
(6) SVF-9.5year = df(on coupon 1 date 1) + df2 + df3 + . . . + df9.5year Table 2 illustrates two exemplary results that may be calculated utilizing the equations (1) to (6) shown in Table 1. Example 1 illustrates a situation in which the implied value or the nine and a half (9.5) year swap is greater (−$5,000, the negative sign indicates that the central counterparty must pay this amount to parties of the swap). Similarly, example 2 illustrates a situation in which the implied value or the nine and a half (9.5) year swap is less ($5,000, in this instance the central counterparty receives, or should receive, this amount from parties of the swap)

TABLE 2

| Example 1 | Example 2 |
|---|---|
| Price 10 year Swap = $10,000 | Price 10 year Swap = $15,000 |
| Implied Price 9.5 year Swap = $15,000 | Implied Price 9.5 year Swap = $10,000 |
| Recovery Conversion Value = −$5,000 | Recovery Conversion Value = $5,000 |

Returning to FIG. 1, at block 106, the central clearing party may allow the identified non-defaulting parties holding positions opposite to that of the swap position in default to bid or offer to purchase or assume the position of the default swap. If, as is the case in Example 1, the NPV differential is negative (−$5,000), then the central counterparty may accept bids from non-defaulting parties to convert the position(s). If, as is the case in Example 2, the NPV differential is positive ($5,000), a potential case of a downward slope in the yield curve in the example of the eight and a half (9.5) to ten (10) year, then central counterparty may accept offers (or negative bids) to convert the position(s). If no bids or offers are indicated, the clearing house may randomly assign owner(s) from the available counter parties with the implied differential as variation. This no bid scenario is not likely since the central counterparty may require or otherwise mandate that cleared swaps market-makers to agree to bid or make an offer in-order to be designated as market-makers.

At block 108, the central counterparty may offload the once-illiquid and now-converted swap positions to the winning bidder or offering party.

Figure 2:
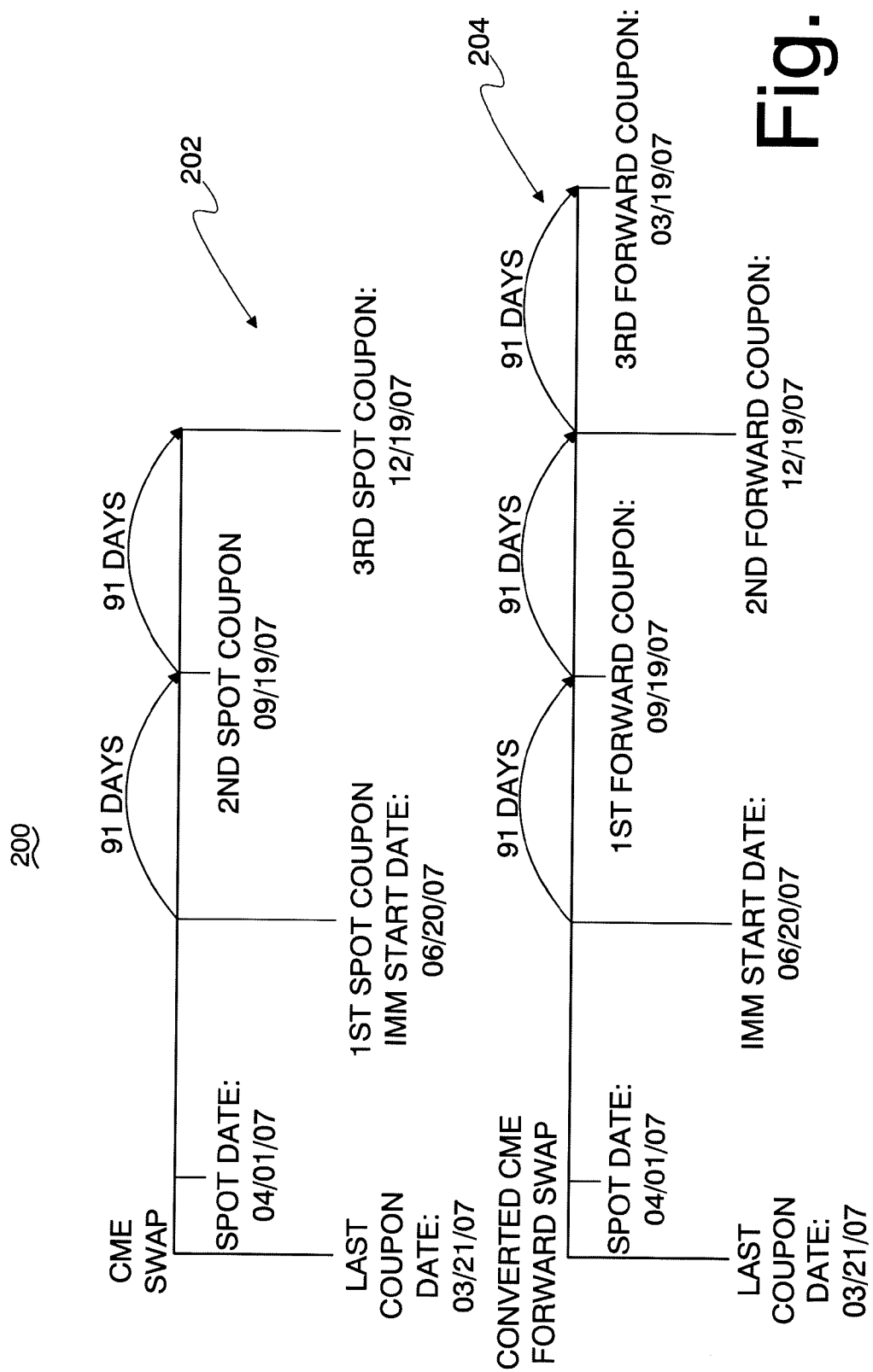
FIG. 2 illustrates an exemplary conversion diagram with forward rates.

FIG. 2 illustrates a sample conversion diagram 200 with forward rates. The conversion diagram in this present example, illustrates a detailed conversion between an illiquid swap 202 and a standard swap 204. In this example, the swap 202 has a maturity or term of nine and a half (9.5) years and a settlement rate of four point nine-eight percent (4.98%), and the standard swap 204 has a maturity or term of ten (10) years and a settlement rate of five percent (5.00%). Both the illiquid swap 202 and the standard swap 204 are assumed, for the present example, to be based on a notion value of one million dollars ($1,000,000).

As previously discussed, it may be assumed that the illiquid swap 202 is a previously defined and contracted swap between two parties, one of which has been determined to be in default. Because the illiquid swap 202 has a non-standard maturity and term, it is considered to be illiquid, i.e., there is little or no trading market for a financial product having this non-standard maturity. Thus, in order to dispose of the defaulted swap product, the central counterparty may convert it to, for example, the standard swap 204 for which a trading market exists.

As an initial matter, the differential NPV of the illiquid swap 202 and the standard swap 204 may be determined. The calculated differential NPV equals approximately nine-thousand dollars ($8,906.43) based on the parameters discussed in connection with this example. In this instance, the NPV differential is negative, i.e., the central counterparty would be required to pay out all or part of the $8,906.43 to a non-defaulting party interested in assuming defaulted let of the converted swap, because the NPV of the standard swap 204 is greater than the NPV of the illiquid swap 202. In other words, as previously discussed, the central counterparty could allow non-defaulting parties interested in a ten year swap to bid how much they are willing to pay to convert the position(s) to receive the variation. In another embodiment, the central counterparty may obtain a neutralizing liquid swap prior, e.g., the standard swap 204, to converting the illiquid swap 202 such that the final long/short positions are zero.

The conversion diagram 200 illustrates an example of converting the illiquid swap 202 to the standard, i.e., longer dated and more liquid, swap 204. As previously discussed, upon determining that the illiquid swap 202 is in default, the central counterparty may identify and determine other non-defaulting parties holding positions opposite to that of the swap position in default. Assume for the purposes of this example, that the defaulting party is long on the floating leg, i.e., the defaulting party pays the fixed leg party.

Table 3 provides and lists equations (1) to (6) which may be utilized to calculate the Recovery Conversion Value (RCV) associated with the nine and a half year illiquid swap 202. As previously discussed in connection with Table 1, the equations (1) to (4a) provide an exemplary mathematical illustration of how the Recovery Conversion Value may be determined. Equations (5) and (6) provide a specific example of how the Implied Price of a nine and a half year (9.5) swap may be determined.

TABLE 3

(1) NPV(9.5 year Swap) + NPV(0.5 year forward Swap) = NPV(10 year Swap)
(2) NPV(0.5 year forward Swap) = Recovery Conversion Value
(3) NPV(9.5 year Swap) + Recovery Conversion Value = NPV(10 year Swap)
(4) Recovery Conversion Value (RCV) = Price of 10 year Swap − Implied Price of 9.5 year swap
(4a) RCV = [(Current Rate of Desired/More Liquid Swap * Current SVF Liquid) − (Current Rate of Defaulted/Illiquid Swap * Current SVF of Illiquid)] * (Notional/Face Amount of Illiquid Swap)
(5) Implied Price of 9.5 year Swap = (implied rate of 9.5 Swap) * (SVF-9.5year) * (Notional/Face Amount of 9.5 y Swap)
(6) SVF-9.5year = df(on coupon 1 date 1) + df2 + df3 + . . . + df9.5year Depending upon the results determined based on the equations (1) to (6), a number of different scenarios may be encountered. The first scenario occurs if the calculated Recovery Conversion Value (RCV) is greater than zero such that the defaulted (illiquid) swap 202 fixed leg payer receives the RCV. In other words, the defaulted leg of the illiquid swap 202 has a greater market value than the currently offered standard swaps 204. Thus the central counterparty can convince another non-defaulting party to assume the fixed side of the standard swap 204. Stated another way, the central counterparty can offer the standard swap 204 at a value between 0<=Bidding Value<=RCV based on a Dutch auction system, e.g., starting at RCV and then going down to zero. A party wishing to assume the fixed side of the standard swap 204 may win the auction with a bid equal to the RCV and then once the winning party takes over the fixed side of the position, the central counterparty (on behalf of the floating leg payer) pays or reimburses the winning party the RCV. In this case, the entire transaction costs the winning party nothing (RCV−RCV=0) to enter into the swap. Alternatively, if the winning party bids zero for the standard swap 204, then central counterparty (on behalf of the floating leg payer) pays or reimburses the winning party the entire RCV. In this case, the entire transaction nets the winning party a gain of RCV−0=RCV to enter into the swap. These cases illustrate why if there were several bidders involved in the Dutch auction there could be competition to assume the standard swap 204 because at worst the parties will have a liquid standard case at no cost and at best they will have a liquid standard swap and be paid the RCV amount.

The second scenario occurs if the calculated Recovery Conversion Value (RCV) is less than zero such that the defaulted (illiquid) swap 202 fixed leg payer pays the RCV. In this situation, the illiquid OTC swap 202 is worse less than the standard swap 204 which means that the central counterparty may experience difficulties convincing another, non-defaulting party to assume the fixed side of the desired swap. Thus, the central counterparty may be forces to provide a monetary incentive, e.g., a Spread on top of RCV. The standard swap 204 may be offered by the central counterparty at a value between RCV<=Bidding Value<=RCV+Max Spread based on an English auction system. In order to entice a party to assume the standard swap 204, the central counterparty may have to pay the RCV plus a spread in order to ensure that the deal is financially viable. The RCV+Max Spread has to be less than the costs involved in hedging the swap and any other alternatives on hand other than conversion. Stated another way, if the winning party is reimbursed the entire RCV from the central counterparty, then once the winning party assumes their leg of the position, the received RCV may be paid to the floating leg payer. Thus in this case, the entire transaction costs the winning bidder nothing (RCV−RCV=0). Moreover, the winning party can turn around and sell the standard swap 204 at a guaranteed premium because the costs were zero. Alternatively, if the winning party gets the RCV+Max Spread, then once the winning party assumes their leg of the position, the received RCV may be paid to the floating leg payer and the Max Spread may be retained by the winning party. Thus the entire transaction results in a gain of RCV+Max Spread−RCV=Max Spread. Moreover, the winning party can still turn around and sell the standard swap 204 at an even higher premium. These cases illustrate why if there were several bidders involved in an English auction they would each effectively try to compete and reduce the central counterparty because they are guaranteed a profit.

The steps, elements and processes discussed herein may be encoded as program logic, computer readable code and/or instructions. These encoded elements, in turn, may be stored or embedded on a computer readable medium such as, for example, a hard disk drive, a solid state drive or other storage medium. The computer readable medium may be in communication with a processor which, in response to an appropriate input or command, may execute the program logic stored on the computer readable medium. The execution of this program logic may result in the execution of the step, elements and processes embodied and discussed herein.

It should be understood that various changes and modifications to the presently preferred embodiments described herein will be apparent to those skilled in the art. Such changes and modifications can be made without departing from the teachings of the present invention and without diminishing its intended advantages. It is therefore intended that such changes and modifications be covered by the appended claims.

What is claimed is:

1. A method of liquidating defaulted positions associated with centrally cleared illiquid financial product, the method comprising:
    identifying, by a program logic executable by a processor, a defaulted position associated with a centrally cleared financial product offered by a clearing counterparty;
    calculating, by the processor, a value differential between the defaulted position and a standard position;
    offering, by the processor, the value differential and the standard position to a party, wherein the value differential and the standard position represent a converted position; and
    settling, by the processor, the converted position upon acceptance of the offer by the party.

2. The method of claim 1, wherein identifying the defaulted position includes identifying a defaulted position associated with an interest rate swap.

3. The method of claim 2, wherein the interest rate swap comprises an exchange listed financial product.

4. The method of claim 1, wherein identifying the defaulted position includes identifying at least one non-defaulting party to be the party, wherein the non-defaulting party holds at least one position determined to be similar to the defaulted position.

5. The method of claim 1, wherein calculating the value differential includes calculating a net present value differential.

6. The method of claim 1, wherein offering the value differential and the standard position to the party include auctioning the value differential and the standard position.

7. The method of claim 6, wherein the auction is selected from the group consisting of a Dutch auction and an English auction.

8. The method of claim 1, wherein the centrally cleared illiquid financial product is cleared by a central counterparty that interacts with a each party to a transaction in illiquid financial product.

9. A method of liquidating defaulted positions associated with centrally cleared illiquid financial product, the method comprising:
    identifying, by a program logic executable by a processor, a defaulted position associated with a centrally cleared financial product offered by a clearing counterparty;
    identifying, by the processor, at least one non-defaulting party, wherein the non-defaulting party holds at least one position determined to be similar to the defaulted position;
    calculating, by the processor, a net present value differential between the defaulted position and a standard position;
    establishing, by the processor, an auction for the at least one non-defaulting party based on the value differential and the standard position to a party, wherein the value differential and the standard position represent a converted position; and
    settling, by the processor, the converted position upon acceptance of an offer by the at least one non-defaulting party.

10. The method of claim 9, wherein identifying the defaulted position includes identifying a defaulted position associated with an interest rate swap.

11. The method of claim 10, wherein the interest rate swap comprises an exchange listed financial product.

12. The method of claim 9, wherein auctioning the value differential and the standard position includes auctioning the value differential and the standard position in either a Dutch auction or an English auction format.

13. The method of claim 9, wherein the centrally cleared illiquid financial product is cleared by a central counterparty that interacts with a each party to a transaction in illiquid financial product.

14. A default position auction system for auctioning defaulted positions associated with illiquid financial instruments, the system comprising:
   a processor in communication with a computer readable medium, the computer readable medium storing instructions executable by the processor, the instructions configured to:
      clear transactions associated with illiquid financial products, wherein at least one of the transactions results in an open position associated with the illiquid financial product held by a party to the transaction;
      determine a performance bond requirement associated with the open position;
      calculate a default position according to a failure of the party to comply with the performance bond requirement;
      convert the defaulted position to a financial equivalent position having a converted term;
      establish an auction for the converted defaulted position in an open market for a financial instrument having the converted term, the converted defaulted position being offered in an electronic trading system.

15. The system of claim 14, wherein the defaulted position is associated with an interest rate swap.

16. The system of claim 15, wherein the interest rate swap comprises an exchange listed financial product.

17. The system of claim 14, wherein the instructions are further configured to:
   identify at least one non-defaulting party to participate in the auction, wherein the non-defaulting party holds at least one position determined to be similar to the defaulted position.

18. The system of claim 14, wherein calculating the default position includes calculating a net present value differential.

19. The system of claim 14, wherein the auction is selected from the group consisting of a Dutch auction and an English auction.

* * * * *